US011107633B2

(12) United States Patent
Shin et al.

(10) Patent No.: US 11,107,633 B2
(45) Date of Patent: Aug. 31, 2021

(54) CERAMIC ELECTRONIC COMPONENT HAVING EXTERNAL ELECTRODE INCLUDING ELECTRODE LAYER AND CONDUCTIVE RESIN LAYER

(71) Applicant: SAMSUNG ELECTRO-MECHANICS CO., LTD., Suwon-si (KR)

(72) Inventors: Dong Hwi Shin, Suwon-si (KR); Do Yeon Kim, Suwon-si (KR); Sang Soo Park, Suwon-si (KR); Woo Chul Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 20 days.

(21) Appl. No.: 16/222,988

(22) Filed: Dec. 17, 2018

(65) Prior Publication Data
US 2020/0135401 A1 Apr. 30, 2020

(30) Foreign Application Priority Data
Oct. 24, 2018 (KR) .................. 10-2018-0127579

(51) Int. Cl.
*H01G 4/232* (2006.01)
*H01G 4/30* (2006.01)
(Continued)

(52) U.S. Cl.
CPC ......... *H01G 4/2325* (2013.01); *H01G 4/0085* (2013.01); *H01G 4/012* (2013.01); *H01G 4/30* (2013.01); *H01G 4/1227* (2013.01)

(58) Field of Classification Search
CPC combination set(s) only.
See application file for complete search history.

(56) References Cited

U.S. PATENT DOCUMENTS 6,270,906 B1 * 8/2001 Nakamura ........... H01G 4/0085
156/89.14
6,388,864 B1 * 5/2002 Nakagawa ............... H01G 2/14
361/306.3
(Continued)

FOREIGN PATENT DOCUMENTS

CN 103854858 A 6/2014
CN 106910631 A 6/2017
(Continued)

OTHER PUBLICATIONS

Korean Office Action dated Sep. 23, 2019 issued in Korean Patent Application No. 10-2018-0127579 (with English translation).
(Continued)

*Primary Examiner* — David M Sinclair
(74) *Attorney, Agent, or Firm* — Morgan, Lewis & Bockius LLP

(57) ABSTRACT

A ceramic electronic component includes a body including a dielectric layer, and a first internal electrode and a second internal electrode opposing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other, a first external electrode including a first electrode layer connected to the first internal electrode, and a first conductive resin layer disposed on the first electrode layer, and disposed on the third surface of the body, and a second external electrode including a second electrode layer connected to the second internal electrode, and a second conductive resin layer disposed on the second electrode layer, and disposed on the fourth surface of the body.

18 Claims, 6 Drawing Sheets

(51) Int. Cl.
H01G 4/012 (2006.01)
H01G 4/008 (2006.01)
*H01G 4/12* (2006.01)

(56) References Cited

U.S. PATENT DOCUMENTS

| | | | |
|---|---|---|---|
| 9,099,240 B2* | 8/2015 | Park | H01G 4/30 |
| 9,818,546 B2* | 11/2017 | Kurokawa | H01G 4/0085 |
| 9,978,524 B2 | 5/2018 | Yamaguchi | |
| 2005/0083637 A1* | 4/2005 | Yoshll | H01G 4/2325 |
| | | | 361/600 |
| 2014/0153156 A1 | 6/2014 | Park et al. | |
| 2016/0020028 A1* | 1/2016 | Katsuta | H01G 4/0085 |
| | | | 361/301.4 |
| 2016/0027583 A1 | 1/2016 | Ahn et al. | |
| 2016/0093442 A1 | 3/2016 | Nagamoto | |
| 2016/0099106 A1* | 4/2016 | Kurokawa | H01F 27/2804 |
| | | | 361/301.4 |
| 2016/0172110 A1* | 6/2016 | Otani | H01L 41/0472 |
| | | | 361/301.4 |
| 2017/0098506 A1* | 4/2017 | Ando | H01G 4/232 |
| 2017/0178811 A1 | 6/2017 | Chun et al. | |
| 2017/0316883 A1 | 11/2017 | Yamaguchi | |
| 2019/0371527 A1* | 12/2019 | Sugita | H01G 4/2325 |

FOREIGN PATENT DOCUMENTS

| | | |
|---|---|---|
| CN | 107452506 A | 12/2017 |
| JP | 2014-220324 A | 11/2014 |
| JP | 2014-241453 A | 12/2014 |
| KR | 10-2016-0012830 A | 2/2016 |
| KR | 10-2017-0074470 A | 6/2017 |
| KR | 10-2017-0123273 A | 11/2017 |

OTHER PUBLICATIONS

Office Action issued in corresponding Chinese Patent Application No. 201910192654.1, dated Mar. 19, 2021 (with English Translation).

* cited by examiner

CERAMIC ELECTRONIC COMPONENT HAVING EXTERNAL ELECTRODE INCLUDING ELECTRODE LAYER AND CONDUCTIVE RESIN LAYER

CROSS-REFERENCE TO RELATED APPLICATION(S)

This application claims benefit of priority to Korean Patent Application No. 10-2018-0127579 filed on Oct. 24, 2018 in the Korean Intellectual Property Office, the disclosure of which is incorporated herein by reference in its entirety.

TECHNICAL FIELD

The present disclosure relates to a ceramic electronic component.

BACKGROUND

A multilayer ceramic capacitor (MLCC) is a chip-type condenser mounted on a printed circuit substrates of a variety of electronic products such as image display devices, including liquid crystal displays (LCD) and plasma display panels (PDP), computers, smartphones, cellular phones, and the like, serving to charge and discharge electricity.

A multilayer ceramic capacitor may be used as a component of various electronic devices as it is relatively small in size and is able to secure high capacity while being easily installed. As electronic devices such as computers, mobile devices, and the like, have been miniaturized and increased in power, there has been increased demand for miniaturized, high capacity multilayer ceramic capacitors.

Recently, there have been increased interest in electrical components, and multilayer ceramic capacitors have been required to have high reliability and high strength properties to be used in vehicles or infotainment systems.

Particularly, multilayer ceramic capacitors have been required to have high flexural strength. To achieve this, it has been necessary to improve internal and external structures, and the like.

To secure high reliability in multilayer ceramic capacitors, a technique of applying a conductive resin layer to an external electrode has been used to prevent cracks caused by stress by absorbing tensile stress occurring in a mechanical or thermal environment.

A conductive resin layer may electrically and mechanically connect a sintered electrode layer and a plating layer of an external electrode in a multilayer ceramic capacitor, and may protect a multilayer ceramic capacitor from mechanical and thermal stresses and impacts from bending of a substrate, dependent on a process temperature while a circuit substrate is mounted.

However, a conductive resin layer has high resistance, and a product using a conductive resin layer may have an issue of high equivalent series resistance (ESR), as compared to a product which does not use a conductive resin layer.

SUMMARY

An aspect of the present disclosure is to provide a ceramic electronic component having improved reliability.

According to an aspect of the present disclosure, a ceramic electronic component includes a body including a dielectric layer, and a first internal electrode and a second internal electrode opposing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other, a first external electrode including a first electrode layer connected to the first internal electrode, and a first conductive resin layer disposed on the first electrode layer, and disposed on the third surface of the body, and a second external electrode including a second electrode layer connected to the second internal electrode, and a second conductive resin layer disposed on the second electrode layer, and disposed on the fourth surface of the body. tb is less than 80 μm, and (ta+tb)/L*50 is 1 or greater, in which L is a distance between the third and fourth surfaces of the body, ta is a thickness of the first and second electrode layers, and tb is a thickness of the first and second conductive resin layers.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
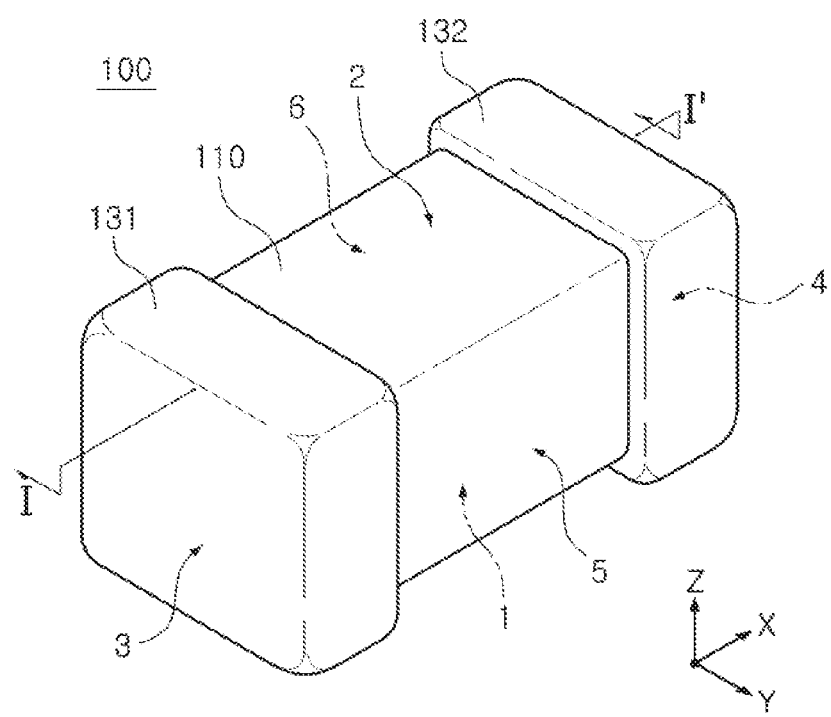
FIG. 1 is a schematic perspective diagram illustrating a ceramic electronic component according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are the same elements in the drawings.

In the drawings, certain elements may be omitted to allow the present disclosure to be clearly described, and to clearly express a plurality of layers and areas, thicknesses may be magnified. The same elements having the same function within the scope of the same concept will be described using the same reference numerals. Further, throughout the specification, it will be understood that when a portion "includes" an element, it can further include another element, not excluding another element, unless otherwise indicated.

In the drawing, an X direction is a second direction or a length direction, a Y direction is a third direction or a width direction, and a Z direction is a first direction, a layering direction, or a thickness direction.

Ceramic Electronic Component

FIG. 1 is a schematic perspective diagram illustrating a ceramic electronic component according to an exemplary embodiment.

Figure 2:
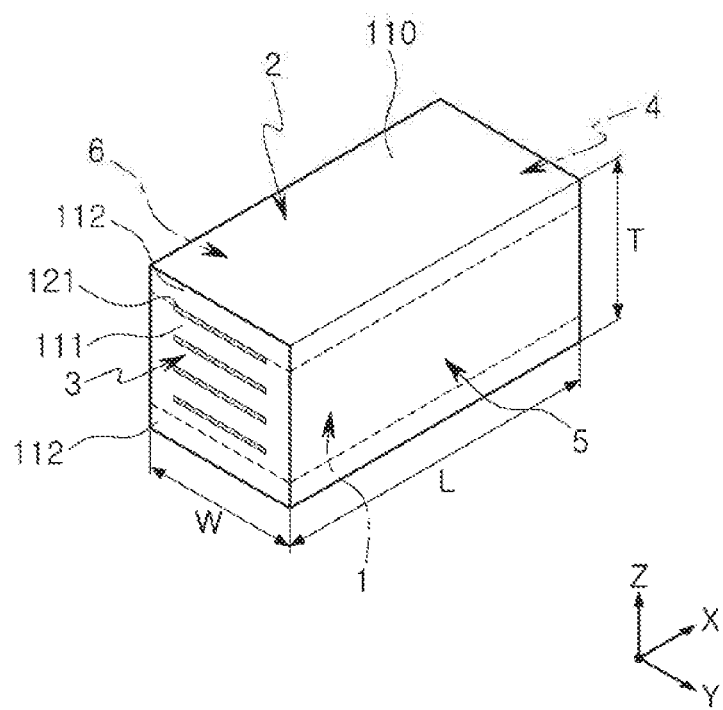
FIG. 2 is a schematic perspective diagram illustrating a body according to an exemplary embodiment in the present disclosure.

FIG. 2 is a schematic perspective diagram illustrating a body according to an exemplary embodiment.

Figure 3:
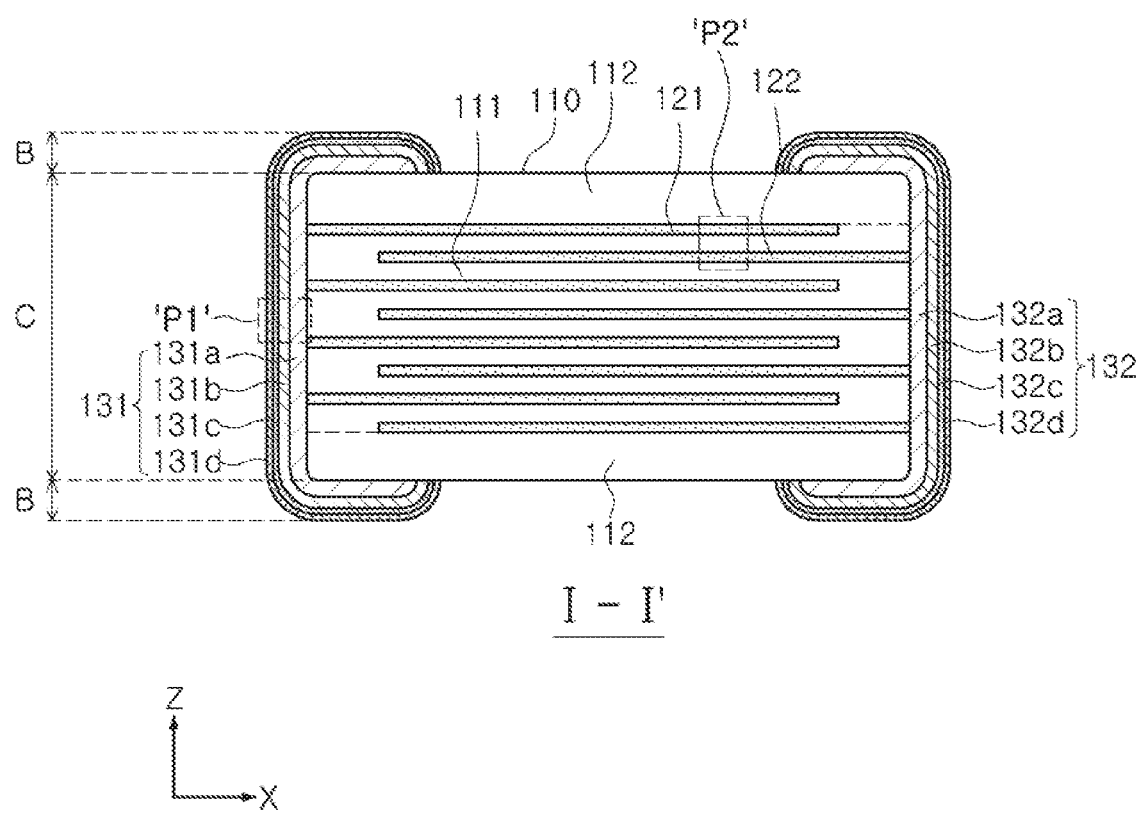
FIG. 3 is a cross-sectional diagram taken along line I-I' in FIG. 1.

FIG. 3 is a cross-sectional diagram taken along line I-I' in FIG. 3.

Figure 4A:
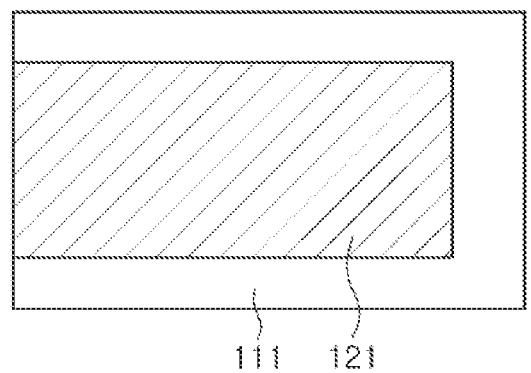
FIG. 4A is a diagram illustrating a ceramic green sheet on which a first internal electrode is printed.
Figure 4B:
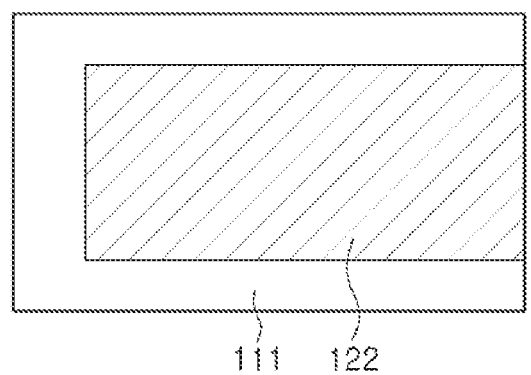
FIG. 4B is a diagram illustrating a ceramic green sheet on which a second internal electrode is printed.

FIG. 4A is a diagram illustrating a ceramic green sheet on which a first internal electrode is printed, and FIG. 4B is a diagram illustrating a ceramic green sheet on which a second internal electrode is printed.

Referring to FIGS. 1 to 4, a ceramic electronic component 100 may include a body 110 including a dielectric layer 111, and a first internal electrode and a second internal electrode 121 and 122 opposing each other with the dielectric layer 111 interposed therebetween, and having first and second surfaces 1 and 2 opposing each other, third and fourth surfaces 3 and 4 connected to the first and second surfaces and opposing each other, and fifth and sixth surfaces 5 and 6 connected to the first to fourth surfaces and opposing each other, and a first external electrode 131 including a first electrode layer 131a connected to the first internal electrode 121, and a first conductive resin layer 131b disposed on the first electrode layer, and disposed on the third surface of the body, and a second external electrode 132 including a second electrode layer 132a connected to the second internal electrode, and a second conductive resin layer 132b disposed on the second electrode layer, and disposed on the fourth surface of the body. When a distance between the third and fourth surfaces 3 and 4 of the body is defined as L, a thickness of the first and second electrode layers 131a and 132a is defined as ta, and a thickness of the first and second conductive resin layers 131b and 132b is defined as tb, tb is less than 80 µm, and (ta+tb)/L*50 is 1 or greater.

In the description below, a ceramic electronic component, particularly a multilayer ceramic capacitor, according to an exemplary embodiment, will be described, but an exemplary embodiment thereof is not limited thereto.

In the body 110, the dielectric layer 111 and the internal electrodes 121 and 122 may be alternately layered.

The body 110 may not be limited to any particular shape. As illustrated, the body 110 may have a hexahedral shape or a shape similar to a hexahedron. Due to contraction of a ceramic powder included in the body 110 during a sintering process, the body 110 may not have an exact hexahedral shape having straight lines, but may have a substantially hexahedral shape.

The body 110 may have the first and second surfaces 1 and 2 opposing each other in a thickness direction (Z direction), the third and fourth surfaces 3 and 4 connected to the first and second surfaces 1 and 2 and opposing each other in a length direction (X direction), and the fifth and sixth surfaces 5 and 6 connected to the first and second surfaces 1 and 2 and the third and fourth surfaces 3 and 4, and opposing each other in a width direction (Y direction).

Referring to FIG. 2, a distance between the first and second surfaces 1 and 2 may be defined as a thickness T of the body, a distance between the third and fourth surfaces 3 and 4 may be defined as a length L of the body, and a distance between the fifth and sixth surfaces 5 and 6 may be defined as a width W of the body.

The plurality of the dielectric layers 111 forming the body 110 may be in a sintered state, and may be integrated such that boundaries between adjacent dielectric layers 111 may be difficult to identify without using a scanning electron microscope (SEM).

According to the exemplary embodiment, a material of the dielectric layer 111 may not be particularly limited as long as sufficient capacitance is able to be obtained therewith. For example, the material may be a barium titanate material, a Perovskite material compound with lead (Pb), a strontium titanate material, or the like.

As the material composing the dielectric layer 111, various ceramic additives, organic solvents, plasticizers, coupling agents, dispersing agents, and the like, may be added in addition to barium titanate ($BaTiO_3$) powder, or the like, depending on an intended purpose.

The plurality of internal electrodes 121 and 122 may oppose each other with the dielectric layer 111 interposed therebetween.

The internal electrodes 121 and 122 may include the first and second internal electrodes 121 and 122 alternately disposed to oppose each other with the dielectric layer interposed therebetween.

The first and second internal electrodes 121 and 122 may be exposed to the third and fourth surfaces 3 and 4, respectively.

Referring to FIGS. 1 to 3, the first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body and connected to the first internal electrode 121, and the second external electrode 132 may be disposed on the fourth surface 4 of the body and connected to the second internal electrode 122.

In this case, the first and second internal electrodes 121 and 122 may be electrically separated from each other by the dielectric layer 111 disposed therebetween. Referring to FIG. 4, the body 110 may be formed by alternately layering a ceramic green sheet a on which the first internal electrode 121 is printed, and a ceramic green sheet b on which the second internal electrode 122 is printed in a thickness direction (Z direction), and performing a sintering process.

A material of the first and second internal electrodes 121 and 122 may not be particularly limited. A material may be a conductive paste formed of one or more materials such as palladium (Pd), palladium-silver (Pd—Ag) alloy, and the like, and nickel (Ni) and copper (Cu), for example.

As a printing method of the conductive paste, a screen printing method, a gravure printing method, or the like, may be used, but the method is not limited thereto.

In this case, the body 110 may be disposed in the ceramic electronic component 100, and the ceramic electronic component 100 may include a capacitance forming portion disposed in the body 110 and forming capacitance including the first internal electrode 121 and the second internal electrode 122 disposed to oppose each other with the dielectric layer 111 interposed therebetween, and a cover portion 112 disposed on upper and lower portions of the capacitance forming portion.

The cover portion 112 may not include the internal electrodes 121 and 122, and may include the same material as the material of the dielectric layer 111. In other words, the cover portion 112 may include a ceramic material, such as a barium titanate material, a Perovskite material compound with lead (Pb), a strontium titanate material, or the like.

The cover portion 112 may be formed by disposing a single dielectric layer or layering two or more dielectric layers on upper and lower surfaces of the capacitance forming portion, respectively, and may prevent damage to an internal electrode caused by physical or chemical stress.

The ceramic electronic component 100 according to the exemplary embodiment may include a first external electrode 131 disposed on the third surface 3 of the body, and the second external electrode 132 disposed on the fourth surface 4 of the body.

The first external electrode 131 may include the first electrode layer 131a connected to the first internal electrode 121, and the first conductive resin layer 131b disposed on the first electrode layer 131a.

The second external electrode 132 may include the second electrode layer 132a connected to the second internal electrode 122, and the second conductive resin layer 132b disposed on the second electrode layer 132a.

The first external electrode 131 may further include a first Ni plating layer 131c disposed on the first conductive resin layer 131b, and a first Sn plating layer 131d disposed on the first Ni plating layer 131c.

The second external electrode 132 may further include a second Ni plating layer 132c disposed on the second conductive resin layer 132b, and a second Sn plating layer 132d disposed on the second Ni plating layer 132c.

The first and second external electrodes 131 and 132 may be electrically connected to the first and second internal electrodes 121 and 122, respectively, and the second external electrode 132 may be connected to a potential different from a potential of the first external electrode 131.

The electrode layers 131a and 132a may include a conductive metal and glass.

A material of the electrode layers 131a and 132a may not be limited to any particular material as long as the material is able to be electrically connected to the internal electrode to form capacitance. The material may be, for example, one or more materials selected from a group comprised of copper (Cu), silver (Ag), nickel (Ni), and alloys thereof, for example.

The electrode layers 131a and 132a may be formed by applying a conductive paste made by adding glass frit to the conductive metal powder, and performing a sintering process.

The conductive resin layers 131b and 132b may be formed on the electrode layers 131a and 132a, and may entirely cover the electrode layers 131a and 132a.

In other words, a distance from the third surface 3 of the body 110 to an end of a band portion B of the first electrode layer 131a may be shorter than a distance to an end of the band portion B of the first conductive resin layer 131b, and a distance from the fourth surface 4 of the body 110 to an end of the band portion B of the second electrode layer 132a may be shorter than a distance to an end of the band portion B of the second conductive resin layer 132b. In this case, the first conductive resin layer 131b may cover the end of the first electrode layer 131a and the second conductive resin layer 132b may cover the end of the second electrode layer 132a in the respective band portions B.

The conductive resin layers 131b and 132b may include a conductive metal and a base resin.

The base resin included in the conductive resin layers 131b and 132b may not be limited to any particular resin material as long as the material has adhesive properties and shock absorbing properties, and is able to be mixed with a conductive metal powder to make a paste. The material may include, for example, an epoxy resin.

A material of the conductive metal included in the conductive resin layers 131b and 132b may not be limited to any particular material as long as the material is able to be electrically connected to the electrode layers 131a and 132a. The material may include, for example, one or more materials selected from a group comprised of copper (Cu), silver (Ag), nickel (Ni), and alloys thereof.

The Ni plating layers 131c and 132c may be formed on the conductive resin layers 131b and 132b, respectively, and may entirely cover the conductive resin layers 131b and 132b, respectively.

The Sn plating layers 131d and 132d may be formed on the Ni plating layers 131c and 132c, respectively, and may entirely cover the Ni plating layers 131c and 132c, respectively.

The Sn plating layers 131d and 132d may improve mounting properties.

The external electrodes 131 and 132 may include a connection portion C disposed on the third surface 3 or the fourth surface 4 of the body, and the band portion B extending from the connection portion C to portions of the first and second surfaces 1 and 2.

In this case, the band portion B may not only be extended to portions of the first and second surfaces 1 and 2, but may also extending from the connection portion C to portions of the fifth and sixth surfaces 5 and 6.

In the description below, the first external electrode 131 will be described, but the configuration described in the description below will also be applied to the second external electrode 132.

Figure 5:
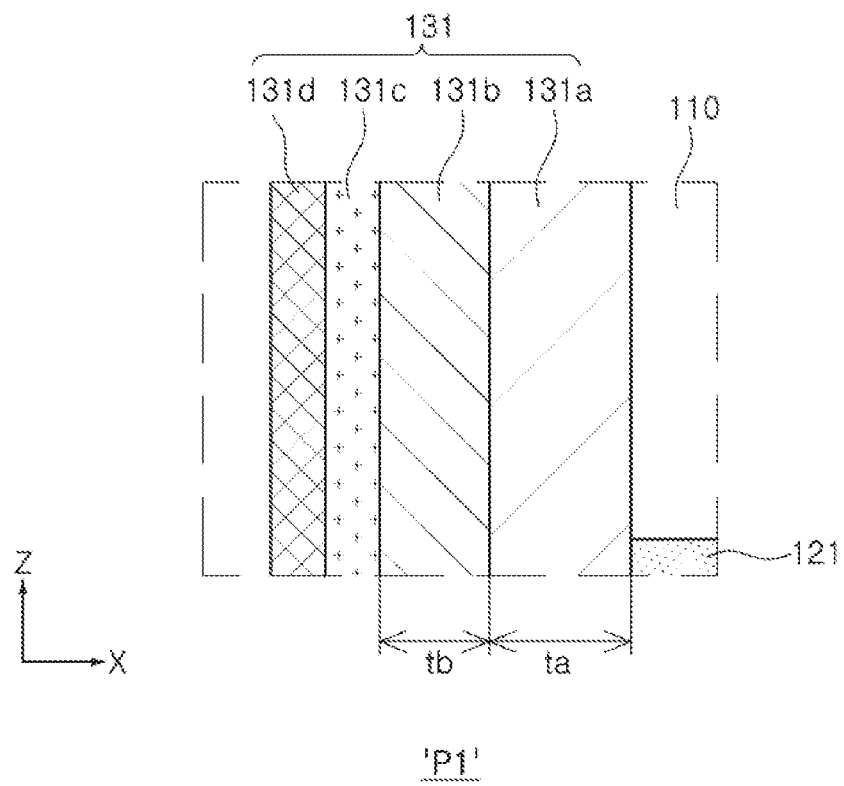
FIG. 5 is a diagram illustrating an area P1 in FIG. 3 in magnified form.

FIG. 5 is a diagram illustrating an area P1 in FIG. 3 in magnified form.

Referring to FIGS. 2 and 5, with regard to a ceramic electronic component according to an exemplary embodiment, when a distance between third and fourth surfaces 3 and 4 is defined as L, a thickness of a first electrode layer 131a is defined as ta, and a thickness of a first conductive resin layer 131b is defined as tb, tb may be less than 80 μm, and (ta+tb)/L*50 may be 1 or greater.

When tb is 80 μm or greater, a thickness of the first conductive resin layer 131b may be significantly increased such that an equivalent series resistance (ESR) may become significantly high. Thus, it may be desirable to configure tb to be less than 80 μm, and may be more desirable to configure tb to be 70 μm or less.

When (ta+tb)/L*50 is less than 1, thicknesses of the first electrode layer 131a and the first conductive resin layer 131b may be insufficient to absorb stress, which may lead to degradation of flexural strength.

By configuring tb to be less than 80 μm and (ta+tb)/L*50 to satisfy 1 or greater, flexural strength may be improved, and an equivalent series resistance (ESR) may be reduced.

In this case, when a distance between fifth and sixth surfaces of the body is defined as W, (ta+tb)/W*100 may satisfy 2 or greater, thereby improving flexural strength.

Also, a thickness of an Ni plating layer 131c and 132c may be 0.5 μm or greater and less than 7 μm.

When a thickness of the Ni plating layer 131c and 132c is less than 0.5 μm, it may be difficult to secure solderability, and when the thickness is greater than 7 μm, cracks caused by bending due to plating stress may occur more frequently, which may lead to degradation of flexural strength.

A thickness of an Sn plating layer 131d and 132d may be 0.5 μm or greater and less than 12 μm.

When a thickness of the Sn plating layer 131d and 132d is less than 0.5 μm, it may be difficult to secure solderability, and when the thickness is greater than 12 μm, cracks caused by bending due to plating stress may occur more frequently, which may lead to degradation of flexural strength.

Figure 6:
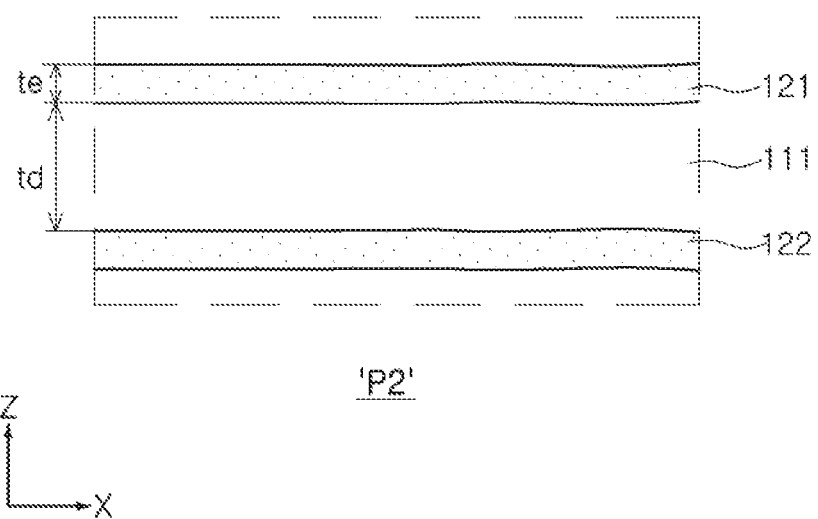
FIG. 6 is a diagram illustrating an area P2 in FIG. 3 in magnified form.

FIG. 6 is a diagram illustrating an area P2 in FIG. 3 in magnified form.

Referring to FIG. 6, with regard to a ceramic electronic component according to an exemplary embodiment, a thickness td of a dielectric layer 111 and a thickness te of an internal electrode 121 and 122 may satisfy td>2*te.

In other words, referring to the exemplary embodiment, the thickness td of the dielectric layer 111 may be greater than twice the thickness te of the internal electrode 121 and 122.

Generally, an electronic component used for a high voltage electrical component has an issue of low reliability caused by degradation of insulation breakdown voltage in a high voltage environment.

In the multilayer ceramic capacitor according to the exemplary embodiment, to prevent degradation of insulation breakdown voltage in a high voltage environment, the thickness td of the dielectric layer 111 may be configured to be greater than twice the thickness te of the internal electrodes 121 and 122 to increase the thickness of the dielectric layer, the distance between the internal electrodes, thereby improving insulation breakdown voltage.

When the thickness td of the dielectric layer 111 is less than twice the thickness te of the internal electrode 121 and 122, the thickness of the dielectric layer, a distance between the internal electrodes, may be reduced, and insulation breakdown voltage may be degraded.

The thickness te of the internal electrode may be less than 1 μm, and the thickness td of the dielectric layer may be less than 2.8 μm, but the thicknesses are not limited thereto.

Table 1 below relates to an examination of flexural strength and an equivalent series resistance (ESR) in accordance with a thickness ta of an electrode layer, a thickness tb of a conductive resin layer, and a length L and a width W of a body.

As for flexural strength, after samples of a multilayer ceramic capacitor were mounted on a substrate, a distance to a central portion at which pressure is applied when the substrate is bent was set to 6 mm, and a presence of cracks was observed. Samples in which cracks did not occur were indicated as "O," and samples in which cracks occurred were indicated as "X."

Samples in which an equivalent series resistance (ESR) was 28.5 mΩ or less were indicated as "O," and samples in which an equivalent series resistance (ESR) was greater than 28.5 mΩ were indicated as "X."

TABLE 1

| Sample No. | ta (μm) | tb (μm) | L (mm) | W (mm) | (ta + tb)/ L * 50 | (ta + tb)/ W * 100 | Flexural Strength | ESR |
|---|---|---|---|---|---|---|---|---|
| 1* | 10 | 5 | 1.5 | 0.78 | 0.5 | 1.92 | X | O |
| 2 | 10 | 25 | 1.5 | 0.78 | 1.17 | 4.49 | O | O |
| 3 | 10 | 40 | 1.5 | 0.78 | 1.67 | 6.41 | O | O |
| 4 | 10 | 55 | 1.5 | 0.78 | 2.17 | 8.33 | O | O |
| 5 | 30 | 10 | 1.5 | 0.78 | 1.33 | 5.13 | O | O |
| 6 | 30 | 25 | 1.5 | 0.78 | 1.83 | 7.05 | O | O |
| 7 | 30 | 40 | 1.5 | 0.78 | 2.33 | 8.97 | O | O |
| 8 | 30 | 55 | 1.5 | 0.78 | 2.83 | 10.9 | O | O |
| 9 | 45 | 10 | 1.5 | 0.78 | 1.83 | 7.05 | O | O |
| 10 | 45 | 25 | 1.5 | 0.78 | 2.33 | 8.97 | O | O |
| 11 | 45 | 40 | 1.5 | 0.78 | 2.83 | 10.9 | O | O |
| 12 | 45 | 55 | 1.5 | 0.78 | 3.33 | 12.82 | O | O |
| 13* | 20 | 20 | 3.3 | 2.5 | 0.61 | 1.6 | X | O |
| 14 | 20 | 50 | 3.3 | 2.5 | 1.06 | 2.8 | O | O |
| 15* | 20 | 80 | 3.3 | 2.5 | 1.52 | 4 | O | X |
| 16* | 20 | 110 | 3.3 | 2.5 | 1.97 | 5.2 | O | X |
| 17 | 50 | 20 | 3.3 | 2.5 | 1.06 | 2.8 | O | O |
| 18 | 50 | 50 | 3.3 | 2.5 | 1.52 | 4 | O | O |
| 19* | 50 | 80 | 3.3 | 2.5 | 1.97 | 5.2 | O | X |
| 20* | 50 | 110 | 3.3 | 2.5 | 2.42 | 6.4 | O | X |
| 21 | 80 | 20 | 3.3 | 2.5 | 1.52 | 4 | O | O |
| 22 | 80 | 50 | 3.3 | 2.5 | 1.97 | 5.2 | O | O |
| 23* | 80 | 80 | 3.3 | 2.5 | 2.42 | 6.4 | O | X |
| 24* | 80 | 110 | 3.3 | 2.5 | 2.88 | 7.6 | O | X |

*Comparative Example

Referring to Table 1 above, in accordance with the exemplary embodiment, in the samples in which tb was less than 80 μm, and (ta+tb)/L*50 satisfied 1 or greater, flexural strength properties was improved while an ESR was reduced.

In samples 1 and 13, however, (ta+tb)/L*50 was less than 1, and flexural strength properties was degraded, and in samples 15, 16, 19, 20, 23 and 24, tb was 80 μm or greater, and an ESR was increased.

According to the aforementioned exemplary embodiments, by adjusting thicknesses of an electrode layer and a conductive resin layer in an external electrode considering a length of a body, flexural strength may be improved while reducing an equivalent series resistance (ESR), thereby improving reliability of a ceramic electronic component.

While the exemplary embodiments have been shown and described above, it will be apparent to those skilled in the art that modifications and variations could be made without departing from the scope of the present invention as defined by the appended claims.

What is claimed is:

1. A ceramic electronic component, comprising:
a body comprising a dielectric layer, and a first internal electrode and a second internal electrode stacked in a thickness direction of the body and opposing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other;
a first external electrode comprising a first electrode layer connected to the first internal electrode, and a first conductive resin layer disposed on the first electrode layer, and disposed on the third surface of the body; and
a second external electrode comprising a second electrode layer connected to the second internal electrode, and a second conductive resin layer disposed on the second electrode layer, and disposed on the fourth surface of the body,
wherein tb is 40 μm to 55 μm, (ta+tb)/L*50 is 1.06 to 3.33, and (ta+tb)/W*100 is 2.8 to 12.82, in which:
L is a distance between the third and fourth surfaces of the body,
ta is a thickness of a portion of the first and second electrode layers, the portion of the first and second electrode layers being located at a center portion of the body in the thickness direction,
tb is a thickness of a portion of the first and second conductive resin layers, the portion of the first and second conductive resin layers being located at the center portion of the body in the thickness direction, and W is a distance between the fifth and sixth surfaces of the body.

2. The ceramic electronic component of claim 1, wherein the first external electrode further comprises a first Ni plating layer disposed on the first conductive resin layer, and a first Sn plating layer disposed on the first Ni plating layer, and the second external electrode further comprises a second Ni plating layer disposed on the second conductive resin layer, and a second Sn plating layer disposed on the second Ni plating layer.

3. The ceramic electronic component of claim 2, wherein a thickness of one of the first and second Ni plating layers is 0.5 μm or greater and less than 7 μm.

4. The ceramic electronic component of claim 2, wherein a thickness of one of the first and second Sn plating layers is 0.5 μm or greater and less than 12 μm.

5. The ceramic electronic component of claim 1, wherein a thickness of one of the first and second internal electrodes is less than 1 μm, and a thickness of the dielectric layer is less than 2.8 μm.

6. The ceramic electronic component of claim 1, wherein te and td satisfy td>2*te, in which te is a thickness of one of the first and second internal electrodes, and td is a thickness of the dielectric layer.

7. The ceramic electronic component of claim 1, wherein the first and second electrode layers comprise one or more conductive metals selected from a group comprised of copper (Cu), silver (Ag), nickel (Ni) and alloys thereof, and glass.

8. The ceramic electronic component of claim 1, wherein the first and second conductive resin layers comprise one or more conductive metals selected from a group comprised of copper (Cu), silver (Ag), nickel (Ni) and alloys thereof, and a base resin.

9. The ceramic electronic component of claim 1, wherein tb is 40 μm to 50 μm, (ta+tb)/L*50 is 2.42 to 3.33, and (ta+tb)/W*100 is 8.33 to 12.82.

10. A ceramic electronic component, comprising:
a body comprising a dielectric layer, and a first internal electrode and a second internal electrode opposing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other;
a first external electrode comprising a first electrode layer connected to the first internal electrode, and a first conductive resin layer disposed on the first electrode layer, and disposed on the third surface of the body; and
a second external electrode comprising a second electrode layer connected to the second internal electrode, and a second conductive resin layer disposed on the second electrode layer, and disposed on the fourth surface of the body,
wherein tb is less than 80 μm, and (ta+tb)/L*50 is 1 or greater, in which L is a distance between the third and fourth surfaces of the body and is 1.5 mm or 3.3 mm, to is a thickness of the first and second electrode layers, and tb is a thickness of the first and second conductive resin layers.

11. The ceramic electronic component of claim 10, wherein (ta+tb)/W*100 is 2 or greater, in which W is a distance between the fifth and sixth surfaces of the body.

12. The ceramic electronic component of claim 10, wherein the first external electrode further comprises a first Ni plating layer disposed on the first conductive resin layer, and a first Sn plating layer disposed on the first Ni plating layer, and the second external electrode further comprises a second Ni plating layer disposed on the second conductive resin layer, and a second Sn plating layer disposed on the second Ni plating layer.

13. The ceramic electronic component of claim 12, wherein a thickness of one of the first and second Ni plating layers is 0.5 μm or greater and less than 7 μm.

14. The ceramic electronic component of claim 12, wherein a thickness of one of the first and second Sn plating layers is 0.5 μm or greater and less than 12 μm.

15. The ceramic electronic component of claim 10, wherein a thickness of one of the first and second internal electrodes is less than 1 μm, and a thickness of the dielectric layer is less than 2.8 μm.

16. The ceramic electronic component of claim 10, wherein te and td satisfy td>2*te, in which te is a thickness of one of the first and second internal electrodes, and td is a thickness of the dielectric layer.

17. The ceramic electronic component of claim 10, wherein the first and second electrode layers comprise one or more conductive metals selected from a group comprised of copper (Cu), silver (Ag), nickel (Ni) and alloys thereof, and glass.

18. The ceramic electronic component of claim 10, wherein the first and second conductive resin layers comprise one or more conductive metals selected from a group comprised of copper (Cu), silver (Ag), nickel (Ni) and alloys thereof, and a base resin.

* * * * *